US010313724B1

(12) United States Patent
Propst et al.

(10) Patent No.: US 10,313,724 B1
(45) Date of Patent: *Jun. 4, 2019

(54) MEDIA-BROADCASTING SYSTEM WITH BROADCAST SCHEDULE SIMULATION FEATURE (71) Applicant: Tribune Broadcasting Company, LLC, Chicago, IL (US)

(72) Inventors: Scott Allan Propst, Noblesville, IN (US); Dana A. Lasher, Morgan Hill, CA (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/955,390

(22) Filed: Apr. 17, 2018

Related U.S. Application Data

(63) Continuation of application No. 15/611,481, filed on Jun. 1, 2017, now Pat. No. 9,992,524, which is a
(Continued)

(51) Int. Cl.
*H04N 21/262* (2011.01)
*H04N 21/81* (2011.01)
(Continued)

(52) U.S. Cl.
CPC ...... *H04N 21/26258* (2013.01); *H04H 20/10* (2013.01); *H04N 21/233* (2013.01); *H04N 21/2407* (2013.01); *H04N 21/812* (2013.01); *H04N 21/8106* (2013.01); *H04N 21/8133* (2013.01); *H04N 21/8456* (2013.01)

(58) Field of Classification Search
CPC ........... H04N 21/26258; H04N 21/233; H04N 21/2407; H04N 21/8106; H04N 21/812; H04N 21/8133; H04N 21/8456; H04H 20/10
See application file for complete search history.

(56) References Cited

U.S. PATENT DOCUMENTS

| 8,793,728 B1 * | 7/2014 | Hundemer | ....... H04N 21/23424 725/36 |
| 8,955,026 B1 * | 2/2015 | Hundemer | ........... H04N 21/262 725/116 |

(Continued)

*Primary Examiner* — Hunter B Lonsberry
(74) *Attorney, Agent, or Firm* — McDonnell Boehnen Hulbert & Berghoff (57) ABSTRACT

In one aspect, an example method includes (i) accessing, by a computing system, a broadcast schedule, which indicates that a broadcast of a first media content item is scheduled to be followed by a broadcast of a second media content item, wherein the computing system can operate in a schedule mode or a breakout mode; (ii) switching from operating in the schedule mode to operating in the breakout mode; and (iii) while operating in the breakout mode: (a) simulating a broadcast of the first media content item; (b) making a determination that a particular signal is embedded in the first media content item; (c) responsive to making the determination, simulating a switch from broadcasting the first media content item to broadcasting the second media content item; (d) based on the simulated broadcast of the first and second media content items, generating a simulation log; and (e) presenting the generated log.

20 Claims, 6 Drawing Sheets

Related U.S. Application Data continuation of application No. 15/135,868, filed on Apr. 22, 2016, now Pat. No. 9,762,941.

(51) Int. Cl.
*H04H 20/10* (2008.01)
*H04N 21/233* (2011.01)
*H04N 21/845* (2011.01)
*H04N 21/24* (2011.01)

(56) References Cited

U.S. PATENT DOCUMENTS 9,762,941 B1 * 9/2017 Propst .................. H04H 20/103
9,992,524 B1 * 6/2018 Propst .................. H04H 20/103

* cited by examiner

| Record | Description | Start Time | Start-Time Type | Duration | Media Source Identifier | Media Content Item Identifier |
|---|---|---|---|---|---|---|
| 1 | Program A, Segment 1 | 05:00:00:00 | Absolute | 00:07:00:00 | ID-Receiver-A | |
| 2 | Commercial A | 05:07:00:00 | Absolute | 00:00:30:00 | ID-Server-A | ID-Com-A |
| 3 | Commercial B | 05:07:30:00 | Absolute | 00:00:30:00 | ID-Server-B | ID-Com-B |
| 4 | Program A, Segment 2 | 05:08:00:00 | Absolute | 00:07:00:00 | ID-Receiver-A | |
| 5 | Commercial C | 05:15:00:00 | Absolute | 00:00:30:00 | ID-Server-C | ID-Com-C |
| . . . | | | | | | |
| 25 | Program B, Segment 1 | 06:00:00:00 | Absolute | 00:07:00:00 | ID-Server-A | ID-Prog-B1 |
| 26 | Commercial J | 06:07:00:00 | Absolute | 00:00:30:00 | ID-Server-B | ID-Com-J |
| 27 | Commercial K | 06:07:30:00 | Absolute | 00:00:30:00 | ID-Server-C | ID-Com-K |
| 28 | Program B, Segment 2 | 06:08:00:00 | Absolute | 00:07:00:00 | ID-Server-A | ID-Prog-B2 |
| 29 | Commercial L | 06:15:00:00 | Absolute | 00:00:30:00 | ID-Server-B | ID-Com-L |
| . . . | | | | | | |
| 55 | Program C, Segment 1 | 07:00:00:00 | Absolute | | ID-Receiver-B | |
| 56 | Commercial T | | Manual | 00:00:30:00 | ID-Server-A | ID-Com-T |
| 57 | Commercial U | | Calculated | 00:00:30:00 | ID-Server-B | ID-Com-U |
| 58 | Commercial V | | Calculated | 00:00:30:00 | ID-Server-C | ID-Com-V |
| 59 | Commercial W | | Calculated | 00:00:30:00 | ID-Server-A | ID-Com-W |
| 60 | Program C, Segment 2 | | . . . | 00:00:30:00 | ID-Receiver-B | |

| Record | Description | Start Time | Start-Time Type | Duration | Media Source Identifier | Media Content Item Identifier |
|---|---|---|---|---|---|---|
| 1 | Program A, Segment 1 | 05:00:00:00 | Absolute | 00:07:00:00 | ID-Receiver-A | |
| 2 | Commercial A | 05:07:00:00 | Absolute | 00:00:30:00 | ID-Server-A | ID-Com-A |
| 3 | Commercial B | 05:07:30:00 | Absolute | 00:00:30:00 | ID-Server-B | ID-Com-B |
| 4 | Program A, Segment 2 | 05:08:00:00 | Absolute | 00:07:00:00 | ID-Receiver-A | |
| 5 | Commercial C | 05:15:00:00 | Absolute | 00:00:30:00 | ID-Server-C | ID-Com-C |
| ... | ... | ... | ... | ... | ... | ... |
| 25 | Program B, Segment 1 | 06:00:00:00 | Absolute | 00:07:00:00 | ID-Server-A | ID-Prog-B1 |
| 26 | Commercial J | 06:07:00:00 | Absolute | 00:00:30:00 | ID-Server-B | ID-Com-J |
| 27 | Commercial K | 06:07:30:00 | Absolute | 00:00:30:00 | ID-Server-C | ID-Com-K |
| 28 | Program B, Segment 2 | 06:08:00:00 | Absolute | 00:07:00:00 | ID-Server-A | ID-Prog-B2 |
| 29 | Commercial L | 06:15:00:00 | Absolute | 00:00:30:00 | ID-Server-B | ID-Com-L |
| ... | ... | ... | ... | ... | ... | ... |
| 55 | Program C, Segment 1 | 07:00:00:00 | Absolute | 00:06:00:00 | ID-Receiver-B | |
| 56 | Commercial T | 07:06:00:00 | Manual | 00:00:30:00 | ID-Server-A | ID-Com-T |
| 57 | Commercial U | 07:06:30:00 | Calculated | 00:00:30:00 | ID-Server-B | ID-Com-U |
| 58 | Commercial V | 07:07:00:00 | Calculated | 00:00:30:00 | ID-Server-C | ID-Com-V |
| 59 | Commercial W | 07:07:30:00 | Calculated | 00:00:30:00 | ID-Server-A | ID-Com-W |
| 60 | Program C, Segment 2 | 07:08:00:00 | | 00:00:30:00 | ID-Receiver-B | |

MEDIA-BROADCASTING SYSTEM WITH BROADCAST SCHEDULE SIMULATION FEATURE

RELATED DISCLOSURE

This disclosure is a continuation of U.S. patent application Ser. No. 15/611,481 filed Jun. 1, 2017, which is a continuation of U.S. patent application Ser. No. 15/135,868 filed Apr. 22, 2016, which are hereby incorporated by reference herein in their entirety.

USAGE AND TERMINOLOGY

In this disclosure, unless otherwise specified and/or unless the particular context clearly dictates otherwise, the terms "a" or "an" means at least one, and the term "the" means the at least one.

BACKGROUND

Unless otherwise specified, the materials described in this section are not prior art to the claims in this disclosure and are not admitted to be prior art by inclusion in this section.

A media-broadcasting system (MBS) can perform various acts and/or functions related to media content. For example, a MBS can receive, generate, and/or output media content.

SUMMARY

In one aspect, an example method is disclosed. The method includes (i) accessing, by a computing system, a broadcast schedule, which indicates that a broadcast of a first media content item is scheduled to be followed by a broadcast of a second media content item, wherein the computing system is configured for operating in a schedule mode or a breakout mode, wherein when operating in the schedule mode, the computing system performs an act that facilitates broadcasting a media content item scheduled in the broadcast schedule, and wherein when operating in the breakout mode, the computing system performs an act that facilitates broadcasting a media content item that is not scheduled in the broadcast schedule; (ii) switching, by the computing system, from operating in the schedule mode to operating in the breakout mode; and (iii) while the computing system operates in the breakout mode: (a) simulating, by the computing system, a broadcast of the first media content item; (b) making, by the computing system, a determination that a particular signal is embedded in the first media content item; (c) responsive to making the determination, simulating, by the computing system, a switch from broadcasting the first media content item to broadcasting the second media content item; (d) based on the simulated broadcast of the first and second media content items, generating, by the computing system, a simulation log; and (e) presenting, by the computing system, the generated simulation log.

In another aspect, an example non-transitory computer-readable medium is disclosed. The computer-readable medium has stored thereon program instructions that upon execution by a processor, cause performance of a set of acts including (i) accessing, by a computing system, a broadcast schedule, which indicates that a broadcast of a first media content item is scheduled to be followed by a broadcast of a second media content item, wherein the computing system is configured for operating in a schedule mode or a breakout mode, wherein when operating in the schedule mode, the computing system performs an act that facilitates broadcasting a media content item scheduled in the broadcast schedule, and wherein when operating in the breakout mode, the computing system performs an act that facilitates broadcasting a media content item that is not scheduled in the broadcast schedule; (ii) switching, by the computing system, from operating in the schedule mode to operating in the breakout mode; and (iii) while the computing system operates in the breakout mode: (a) simulating, by the computing system, a broadcast of the first media content item; (b) making, by the computing system, a determination that a particular signal is embedded in the first media content item; (c) responsive to making the determination, simulating, by the computing system, a switch from broadcasting the first media content item to broadcasting the second media content item; (d) based on the simulated broadcast of the first and second media content items, generating, by the computing system, a simulation log; and (e) presenting, by the computing system, the generated simulation log.

In another aspect, an example computing system is disclosed. The computing system is configured for performing a set of acts including (i) accessing, by the computing system, a broadcast schedule, which indicates that a broadcast of a first media content item is scheduled to be followed by a broadcast of a second media content item, wherein the computing system is configured for operating in a schedule mode or a breakout mode, wherein when operating in the schedule mode, the computing system performs an act that facilitates broadcasting a media content item scheduled in the broadcast schedule, and wherein when operating in the breakout mode, the computing system performs an act that facilitates broadcasting a media content item that is not scheduled in the broadcast schedule; (ii) switching, by the computing system, from operating in the schedule mode to operating in the breakout mode; and (iii) while the computing system operates in the breakout mode: (a) simulating, by the computing system, a broadcast of the first media content item; (b) making, by the computing system, a determination that a particular signal is embedded in the first media content item; (c) responsive to making the determination, simulating, by the computing system, a switch from broadcasting the first media content item to broadcasting the second media content item; (d) based on the simulated broadcast of the first and second media content items, generating, by the computing system, a simulation log; and (e) presenting, by the computing system, the generated simulation log.

DETAILED DESCRIPTION

I. Overview

A MBS can include a scheduling system, which can create and/or modify a broadcast schedule. The broadcast schedule serves as a schedule or outline of a broadcast of media content by the MBS during a given time period. The broadcast schedule can include multiple records, each corresponding to a respective event. One common type of event is the broadcast of a media content item.

Each record can also include various data related to the event. For example, the record can include a start time and a start-time type. The start time indicates a scheduled start time of the event. For example, in the case where the event includes broadcasting a media content item, the start time can indicate a time at which the MBS is scheduled to start broadcasting the media content item. The start-time type indicates how and/or when a sequencing system of the MBS determines the start time for the event. The start-time type can be absolute or manual, for instance. An absolute start-time type indicates that the start time is a fixed time that is not dependent on the occurrence of trigger event. On the other hand, a manual start-time type indicates that the start time is when a particular trigger event occurs.

In one example, the trigger event can be the sequencing system making a determination that a particular signal is embedded in a media content item being broadcast. The particular signal can be a commercial roll signal, which in one example, can be an audio tone. This can allow a provider of a program segment to automatically cause the MBS to transition from broadcasting the program segment to broadcasting a commercial.

The MBS can also include a sequencing system, which can operate in various modes. In one example, the sequencing system can operate in a schedule mode. When operating in the schedule mode, the sequencing system performs an act that facilitates broadcasting a media content item scheduled in a broadcast schedule. As an alternative to operating in the schedule mode, the sequencing system can operate in a breakout mode. When operating in the breakout mode, the sequencing system performs an act that facilitates broadcasting a media content item that is not scheduled in the broadcast schedule.

The sequencing system can switch from operating in a schedule mode to operating in a breakout mode for various reasons. For example, in the case where a breaking news event occurs, it can be desired to interrupt a broadcast of regularly-scheduled programming and replace it with a broadcast of unscheduled programming related to the breaking news event. In one example, the sequencing system can cause this to happen by causing one or more components of a networking system to change their input-to-output mappings such that a breakout media source can start transmitting a breakout media content item, via the networking system, to a distribution system.

In one example, while the sequencing system operates in the breakout mode, the sequencing system can simulate operating in the schedule mode. This simulated operation can provide various benefits. For example, by simulating operation of the schedule mode, the sequencing system can ensure that, when switching from operating in the breakout mode back to operating in the schedule mode, the sequencing system can resume operating in the schedule mode as if the initial switch to the breakout mode never occurred. As another example, by simulating operation of the schedule mode, the sequencing system can generate a simulation log of media content items that were not broadcast as a result of the sequencing system operating in a breakout mode. The sequencing system can then present this simulation log to a user, which the user can consider and use as a basis to modify the broadcast schedule.

To help ensure that the sequencing system generates an accurate simulation log, the sequencing system can perform various acts while operating in the breakout mode. For example, in the case where the sequencing system is simulating the broadcast of a first media content item (e.g., a program segment), the sequencing system can make a determination that a particular signal is embedded in the first media content item. In response to making this determination, the sequencing system can responsively simulate a switch from broadcasting the first media content item to broadcasting the second media content item (e.g., a commercial). This can help ensure that the simulation appropriately represents how the sequencing system would have operated in the schedule mode had the first media content item had the embedded signal.

II. Example Architecture

A. Computing Device

Figure 1:
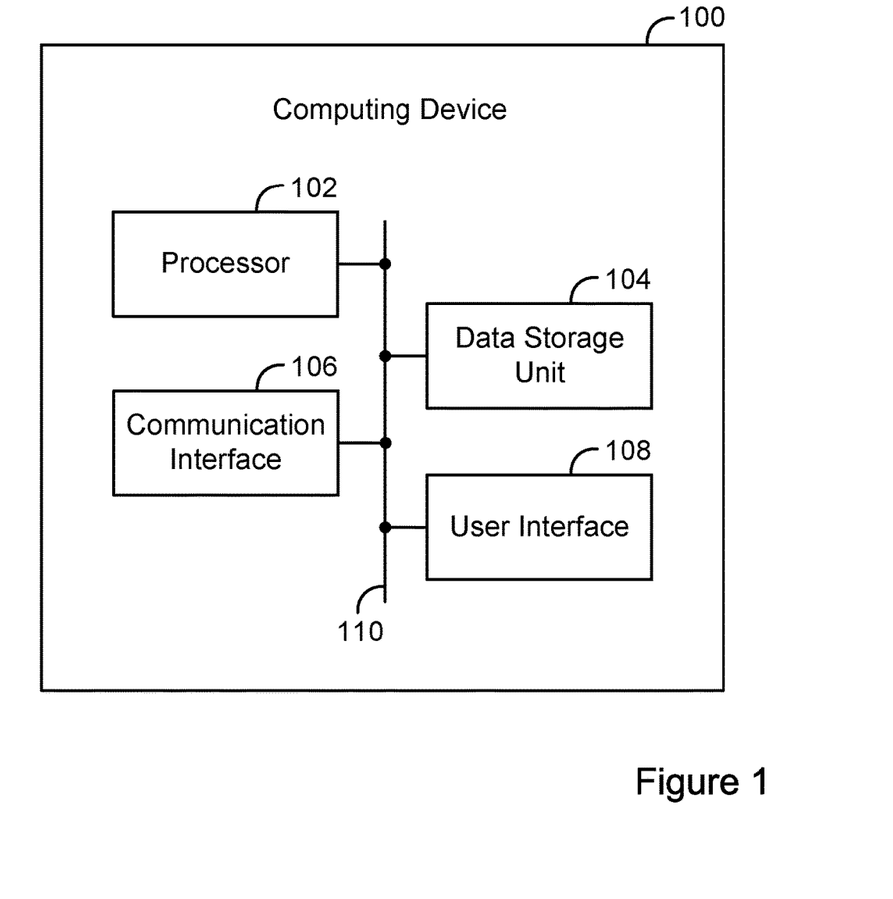
FIG. 1 is a simplified block diagram of an example computing device.

FIG. 1 is a simplified block diagram of an example computing device 100. Computing device 100 can include various components, such as processor 102, data storage unit 104, communication interface 106, and/or user interface 108. Each of these components can be connected with each other via connection mechanism 110.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In one example, a connection mechanism can include a non-tangible medium (e.g., where the connection is wireless).

Processor 102 can include a general-purpose processor (e.g., a microprocessor) and/or a special-purpose processor (e.g., a digital signal processor (DSP)).

Data storage unit 104 can include one or more volatile, non-volatile, removable, and/or non-removable storage components, such as magnetic, optical, and/or flash storage, and/or can be integrated in whole or in part with processor 102. Further, data storage unit 104 can take the form of a non-transitory computer-readable storage medium, having stored thereon program instructions (e.g., compiled or non-compiled program logic and/or machine code) that, upon execution by processor 102, cause computing device 100 to perform one or more acts and/or functions, such as those described in this disclosure. As such, computing device 100 can be configured to perform and/or can perform one or more acts and/or functions, such as those described in this disclosure. Such program instructions can define and/or be part of a discrete software application. In some instances, computing device 100 can execute program instructions in response to receiving an input, such as from communication interface 106 and/or user interface 108. Data storage unit 104 can also store other data, such as the data described in this disclosure.

Communication interface 106 can allow computing device 100 to connect with and/or communicate with another other entity according to one or more protocols. In one example, communication interface 106 can be a wired interface, such as an Ethernet interface or a high-definition serial-digital-interface (HD-SDI). In another example, communication interface 106 can be a wireless interface, such as a cellular or Wi-Fi interface. In this disclosure, a connection can be a direct connection or an indirect connection, the latter being a connection that passes through and/or traverses one or more entities, such as a router, switcher, hub and/or another network device. Likewise, in this disclosure, a transmission can be a direct transmission or an indirect transmission.

User interface 108 can include hardware and/or software components that can facilitate interaction between computing device 100 and a user of computing device 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system.

Computing device 100 can take various forms, such as a workstation terminal, a desktop computer, a laptop, a tablet, a set-top box, a television, and/or a mobile phone.

B. Media-Broadcasting System

Figure 2:
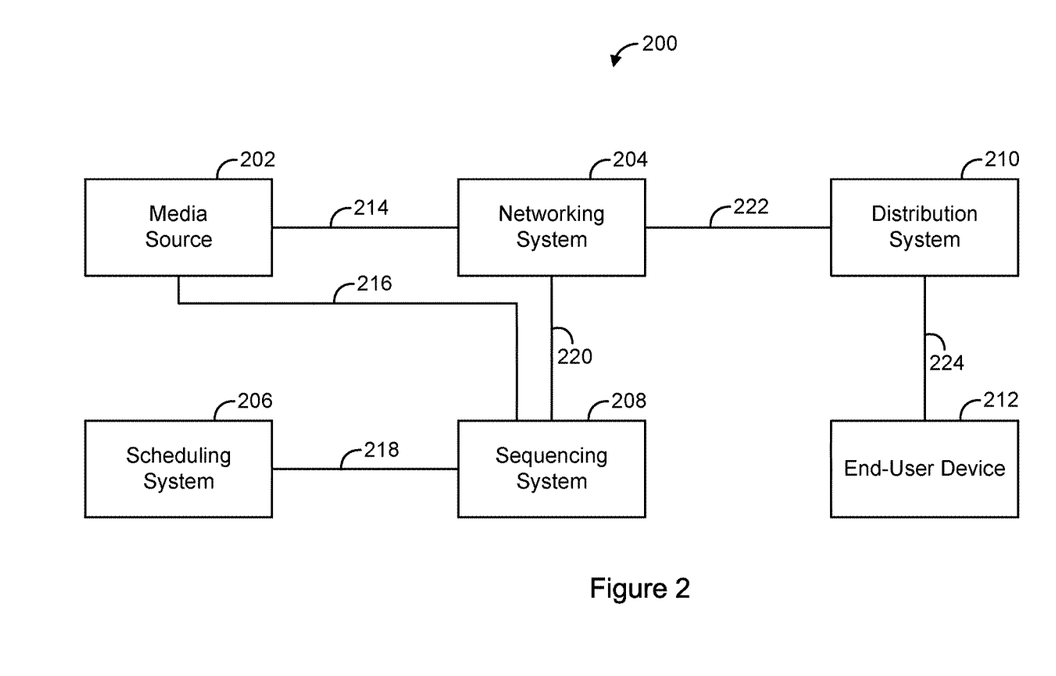
FIG. 2 is a simplified block diagram of an example MBS.

FIG. 2 is a simplified block diagram of an example MBS 200. MBS 200 can perform various acts and/or functions related to media content, and can be implemented as a computing system. In this disclosure, the term "computing system" means a system that includes at least one computing device. In some instances, a computing system can include one or more other computing systems.

MBS 200 can include various components, such as media source 202, networking system 204, scheduling system 206, sequencing system 208, distribution system 210, and end-user device 212, each of which can be implemented as a computing system.

MBS 200 can also include connection mechanism 214, which can connect media source 202 with networking system 204; connection mechanism 216, which can connect media source 202 with sequencing system 208; connection mechanism 218, which can connect scheduling system 206 with sequencing system 208; connection mechanism 220, which can connect networking system 204 with sequencing system 208; connection mechanism 222, which can connect networking system 204 with distribution system 210; and connection mechanism 224, which can connect distribution system 210 with end-user device 212.

Media source 202 can take various forms, such as a media server, a satellite receiver, a character generator, or a digital video-effect (DVE) system. An example media server is the K2 server provided by Grass Valley of San Francisco, Calif. An example character generator is the Viz Trio provided by Viz Rt of Bergen, Norway. DVE system 204 can take various forms, such as a stunt switcher. An example stunt switcher is the Miranda NVision NVS5100MC provided by NVision, Inc. of Coppel, Tex. In practice, MBS 200 is likely to include several media sources 202.

Networking system 204 can take various forms and can include various components, such as a router, switcher, hub, and/or another networking device, each of which can be implemented as a computing system. An example router is the Blackmagic Design Videohub provided by Blackmagic Design Pty. of Freemont, Calif. A switcher can take various forms, such as a stunt switcher.

Scheduling system 206 can take various forms. An example scheduling system is WO Traffic provided by WideOrbit, Inc. of San Francisco, Calif. Another example scheduling system is OSi-Traffic provided by Harris Corporation of Melbourne, Fla.

Distribution system 210 can take various forms, such an air-chain system or a packet-based delivery system. Further, distribution system 210 can include various components, such as a terrestrial antenna, satellite dish, and/or a networking device, each of which can be implemented as a computing system.

III. Example Operations

MBS 200 and/or components thereof can perform various acts and/or functions. These and related features will now be described.

MBS 200 can perform various acts and/or functions related to media content. For example, MBS 200 can receive, generate, output, and/or transmit media content. In this disclosure, the act of receiving, generating, outputting, and/or transmitting media content can occur in various ways and/or according to various standards. For example, the act of receiving, outputting, and/or transmitting media content can include receiving, outputting, and/or transmitting a media stream representing the media content, such as over Internet Protocol (IP) or in accordance with the high-definition serial digital interface (HD-SDI) standard. Likewise, the act of generating media content can include generating a media stream representing the media content. Also, the act of receiving, generating, outputting, and/or transmitting media content can include receiving, generating, outputting, and/or transmitting an encoded or decoded version of the media content.

Media source 202 can generate and/or output media content, and can transmit the media content to networking system 204 and/or to distribution system 210 via networking system 204.

As noted above, media source 202 can take the form of a media server. A media server can store media content (e.g., in the form of a file). The media server can then use the stored media content to generate and output a media stream representing the media content. This process is sometimes referred to in the industry as the media server playing out the media content.

As noted above, media source 202 can also take the form of a character generator. A character generator can generate and output video content based on particular data. For example, a character generator can receive weather data and can then generate video content that includes the weather data. As another example, a character generator can use an ordered set of content items to generate video content that includes the content items in the specified order. This type of generated video content is sometimes referred to in the industry as a "ticker." The content items can include various types of content, such as text and/or images. The ordered set of content items can be stored in various forms, such as in the form of an extended markup Language (XML) file.

As noted above, media source 202 can also take the form of a DVE system. A DVE system can perform various acts and/or functions related to DVEs. For example, a DVE system can execute a DVE, thereby causing the DVE system to generate and output video content.

In one example, the DVE system can receive first video content, and can execute a DVE, which causes the DVE system to generate and output second video content by modifying the first video content. As such, the DVE system can generate and output video content by modifying other video content.

A DVE system can modify video content in various ways, such as by overlaying text, images, video, and/or other content thereon. For example, the DVE system can modify video content by overlaying, on a lower right-hand corner region of the video content, a channel logo. As another example, the DVE system can modify video content by overlaying, on a lower-third region of the video content, a text box including text. As another example, the DVE system can modify video content by scaling or re-positioning the video content or a portion thereof.

Figure 3A:
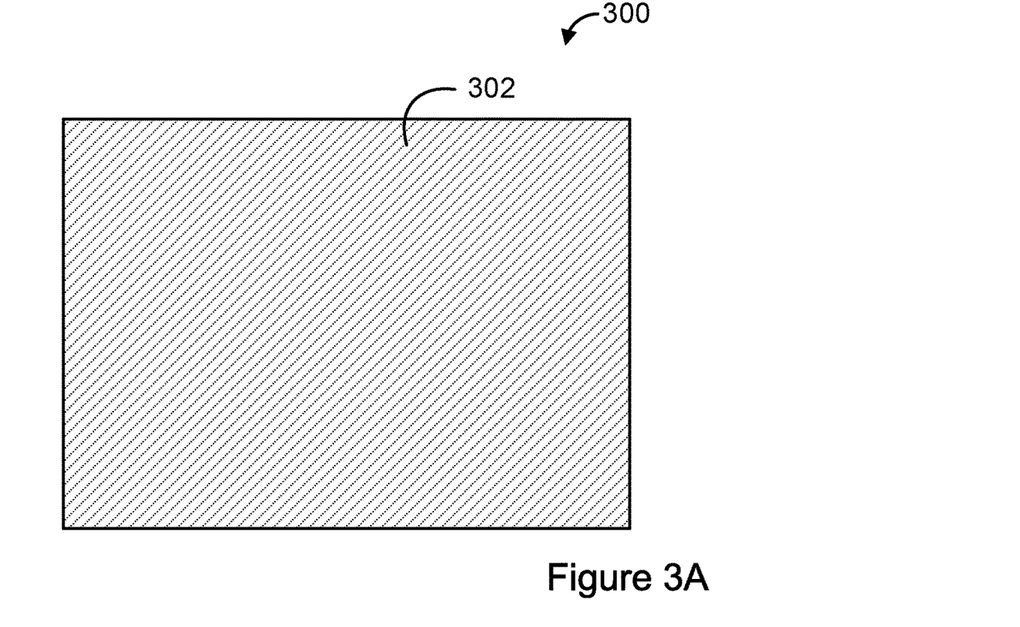
FIG. 3A is an illustration of an example frame, without content overlaid thereon.
Figure 3B:
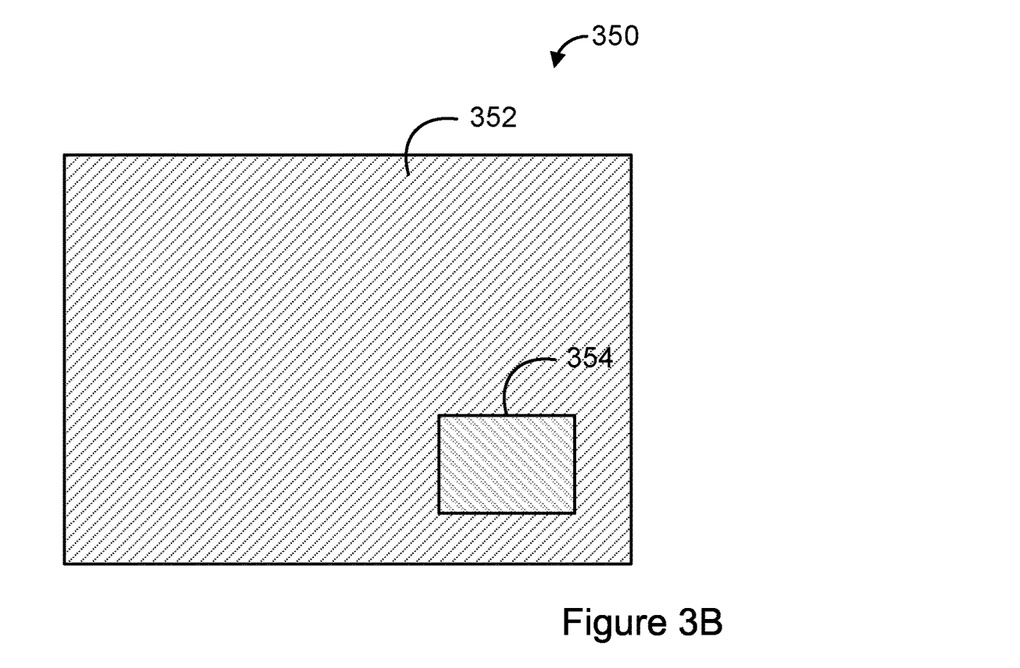
FIG. 3B is an illustration of an example frame, with content overlaid thereon.

FIGS. 3A and 3B help illustrate the concept of overlaying content on video content. FIG. 3A is a simplified illustration of an example frame 300 of video content. Frame 300 includes content 302, but does not include content overlaid on content 302. For comparison, FIG. 3B is a simplified illustration of another example frame 350 of video content. Frame 350 includes content 352 and content 354 overlaid on content 352.

As noted above, a DVE system can execute a DVE, which causes the DVE system to generate and output video content by modifying other video content. However, in another example, a DVE system can execute a DVE, which causes the DVE system to generate and output video content without modifying other video content. This type of DVE is sometimes referred to in the industry as a full-screen DVE.

The DVE system can obtain content for use in connection with executing a DVE in various ways. For example, the DVE system can retrieve the content from a data storage unit of the DVE system. As another example, the DVE system can receive the content from another media source.

A DVE system can perform other acts and/or functions related to DVEs. For example, a DVE system can create and/or modify DVEs, perhaps based on input received from a user via a user interface. When a DVE system creates a DVE, the DVE system can generate and store corresponding program instructions for later retrieval and execution. As such, the act of a DVE system executing a DVE can include the DVE system retrieving and executing program instructions corresponding to the DVE.

Networking system 204 can perform various acts and/or functions related to routing and/or switching media content. As noted above, networking system 204 can include a router. A router can selectively transmit media content from one or more source devices to one or more destination devices. Similarly, a switcher can selectively transmit media content from one or more source devices to a destination device. In some instances, a switcher can take the form of a stunt switcher or another type of DVE system, and thus can also provide DVE-related functionality.

Scheduling system 206 can perform various acts and/or functions related to scheduling and/or managing operation of the MBS 200. For example, scheduling system 206 can create and/or modify a broadcast schedule, perhaps based on input received from a user via a user interface. A broadcast schedule serves as a schedule or outline of a broadcast of media content by a MBS during a given time period. A broadcast schedule is sometimes referred to in the industry as a "traffic log." Sequencing system 208 can process records in a broadcast schedule.

Also, perhaps based on the process records, sequencing system 208 can control one or more components of MBS 200 to facilitate MBS 200 performing various acts. This, in turn, can facilitate MBS 200 generating and/or outputting media content, which can serve as or be part of the broadcast media content. As such, sequencing system 208 can control media source 202 and/or networking system 204, and/or various components thereof. A sequencing system is sometimes referred to in the industry as a broadcast automation system.

Distribution system 210 can receive media content from networking system 204 and/or from media source 202 via networking system 204. Further, distribution system 210 can transmit media content to end-user device 212 for presentation of the media content to an end user. In practice, distribution system 210 can transmit media content to a large number of end-user devices 212 for presentation of the media content to a large number of end users. Distribution system 210 can transmit media content to end-user device 212 in various ways. For example, distribution system 210 can transmit media content to end-user device 212 over-the-air or via a packet-based network such as the Internet. As used in this disclosure, the term "broadcasting" means transmitting by any means.

End-user device 212 can receive media content from distribution system 210, and can present the media content to an end user via a user interface.

As noted above, sequencing system 208 can control one or more components of MBS 200 to facilitate MBS 200 performing various acts. Sequencing system 208 can operate in various modes. In one example, sequencing system 208 can operate in a schedule mode. When operating in the schedule mode, sequencing system 208 performs an act that facilitates broadcasting a media content item scheduled in a broadcast schedule. Typically, a broadcast schedule spans a twenty-hour hour period, but does not align with a calendar day. Rather a broadcast schedule typically spans from 5:00 am ET of one day to 5:00 am ET of the next day. According to this convention, for example, a "Mar. 6, 2012 traffic log" spans from 5:00 am ET on Mar. 6, 2012 to 5:00 am ET on Mar. 7, 2012.

A broadcast schedule can include multiple records, each corresponding to a respective event. One common type of event is the broadcast of a media content item. A media content item can take various forms. One example media content item is a program segment, such as a television-show segment or a movie segment. Another example media content item is a commercial. In some instances, a program segment can include one or more embedded commercials. These types of commercials are sometimes referred to in the industry as "barter commercials."

As noted above, a record of a broadcast schedule can correspond to an event. Each record can also include various data related to the event. For example, the record can include a description, a start time, a start-time type, a duration, a media source identifier, and/or a media content item identifier.

The description describes the event. For example, in the case where the event includes broadcasting a media content item, the description can indicate a title of the media content item. In the case where the media content item is a program segment, the description can further indicate a segment number.

The start time indicates a scheduled start time of the event. For example, in the case where the event includes broadcasting a media content item, the start time can indicate a time at which the MBS 200 is scheduled to start broadcasting the media content item. In some instances, the start time of an event can also represent an end time of a preceding event.

The start-time type indicates how and/or when sequencing system 208 determines the start time for the event. The start-time type can be absolute, calculated, or manual. An absolute start-time type indicates that the start time is a fixed time that is not dependent on the occurrence of trigger event. This is sometimes referred to in the industry as a "hard" start time. A manual start-time type indicates that the start time is when a particular trigger event occurs. A calculated start-time type indicates that the start time is when the preceding event ends. Where a record indicates a calculated start-time type, sequencing system 208 can determined the start time for the corresponding event only after sequencing system 208 determines the start time and the duration of the preceding event.

As noted above, a manual start-time type indicates that the start time is when a trigger event occurs. In one example, the trigger event can be sequencing system 208 receiving particular input from a user via a user interface. In one example, this can allow a technical director to manually cause the MBS 200 to transition from broadcasting a segment of a news program to broadcasting a commercial. This type of transition is sometimes referred to in the industry as "commercial roll."

In another example, the trigger event can be sequencing system 208 making a determination that a particular signal is embedded in a media content item being broadcast. The particular signal can be a commercial roll signal, which in one example, can be an audio tone such as the Audio Cue Tone standard set forth in ANSI/SCTE 35 2013. In one example, this can allow a provider of a program segment to automatically cause the MBS 200 to transition from broadcasting the program segment to broadcasting a commercial.

The duration indicates a scheduled duration of the event. For example, in the case where the event includes broadcasting a media content item that is seven minutes long, the duration can indicate seven minutes.

The media source identifier identifies a media source related to the event. For example, in the case where the event includes broadcasting a media content item that is expected to be received and output by a satellite receiver, the media source identifier can be an identifier that maps to the receiver. As another example, in the case where the event includes broadcasting a media content item expected to be played out by a media server, the media source identifier can be an identifier that maps to the server. As yet another example, in the case where the event includes broadcasting a media content item that is expected to be generated and output by a news production system (NPS), the media source identifier can be an identifier that maps to the NPS.

The media content item identifier identifies a media content item related to the event. For example, in the case where the media content item is a commercial, the media content item identifier can be an Industry Standard Coding Identification (ISCI) number. In another example, the media content item identifier can be an identifier that maps to a location where a file representing the media content item is stored. A media content item identifier is sometimes referred to in the industry as a "house identifier."

Figure 4A:
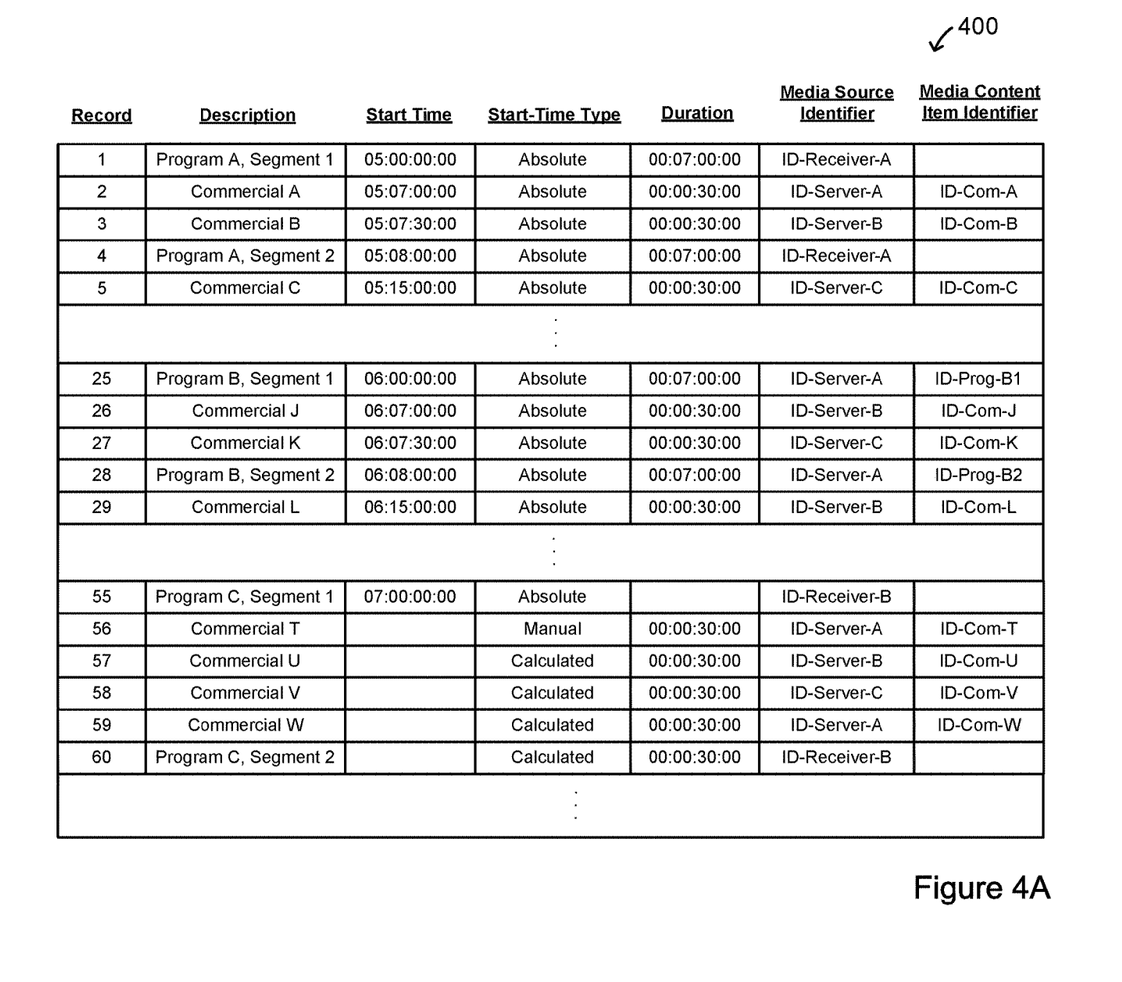
FIG. 4A is a simplified block diagram of an example broadcast schedule in a first state.

FIG. 4A is a simplified diagram of an example broadcast schedule 400 in a first state. Broadcast schedule 400 includes multiple records represented as multiple ordered rows, where each record corresponds to a respective event. For each event, the respective record includes various data related to the event. In particular, each record includes at least one of a description, a start time, a start-time type, a duration, a media source identifier, and a media content item identifier.

Select records of broadcast schedule 400 and corresponding operations of MBS 200 will now be discussed. Record 1 corresponds to an event of MBS 200 receiving a program segment from a satellite receiver and broadcasting the program segment. Record 1 includes a description of Program A, Segment 1, a start time of 05:00:00:00 (in hours::minutes::seconds::frames format), a start-time type of Absolute, a duration of 00:07:00:00, and a media source identifier of ID-Receiver-A. Based on this record, sequencing system 208 can cause MBS 200 to broadcast Program A, Segment 1 by causing various components of MBS 200 to perform various acts. For example, sequencing system 208 can cause one or more components of networking system 204 to, at time 05:00:00:00, change their input-to-output mappings such that a particular media source 202, namely a satellite receiver identified by the identifier ID-Receiver-A, can start transmitting Program A, Segment 1, via networking system 204, to distribution system 210.

Record 2 corresponds to an event of MBS 200 using a media server to playout a commercial and broadcasting the commercial. Record 2 includes a description of Commercial A, a start time of 05:07:00:00, a start-time type of Absolute, a duration of 00:00:30:00, and a media source identifier of ID-Server-A. Based on this record, sequencing system 208 can cause MBS 200 to broadcast Commercial A, by causing various components of MBS 200 to perform various acts. For example, sequencing system 208 can cause a particular media source 202, namely a media server identified by the identifier ID-Server-A, to, sometime before 05:07:00:00, load Commercial A (as identified by the identifier ID-Com-A). Further, sequencing system 208 can cause the media server to, at time 05:07:00:00, playout Commercial A. Further, sequencing system 208 can cause one or more components of networking system 204 to, at time 05:07:00:00, change their input-to-output mappings such that the media server can start transmitting Commercial A, via networking system 204, to distribution system 210.

Record 25 corresponds to an event of MBS 200 using a media server to playout a program segment, and broadcasting the program segment. Record 25 includes a description of Program B, Segment 1, a start time of 06:00:00:00, a start-time type of Absolute, a duration of 00:07:00:00, a media source identifier of ID-Server-A, and a media content item identifier of ID-Prog-B1. Based on this record, sequencing system 208 can cause MBS 200 to broadcast Program B, Segment 1, by causing various components of MBS 200 to perform various acts. For example, sequencing system 208 can cause a particular media source 202, namely a media server identified by the identifier ID-Server-A, to, sometime before 06:00:00:00, load Program B, Segment 1 (as identified by the identifier ID-Prog-B1). Further, sequencing system 208 can cause the media server to, at time 06:00:00:00, playout Program B, Segment 1. Further, sequencing system 208 can cause one or more components of networking system 204 to, at time 06:00:00:00, change their input-to-output mappings such that the media server can start transmitting Program B, Segment 1, via networking system 204, to distribution system 210.

Record 55 corresponds to an event of MBS 200 receiving a program segment from a satellite receiver, and broadcasting the program segment. Record 55 includes a description of Program C, Segment 1, a start time of 07:00:00:00, a start time type of Absolute, and a media source identifier of ID-Receiver-B. Based on this record, sequencing system 208 can cause MBS 200 to broadcast Program C, Segment 1 by causing various components of MBS 200 to perform various acts. For example, sequencing system 208 can cause one or more components of networking system 204 to, at time 07:00:00:00, change their input-to-output mappings such that a particular media source 202, namely a satellite receiver identified by the identifier ID-Receiver-B, can start transmitting Program C, Segment 1, via networking system 204, to distribution system 210.

Notably, record 55 does not include a duration. This can be a result of the next record, Record 56, including a Manual start-time type as described below.

Record 56 corresponds to an event of MBS 200 using a media server to playout a commercial and broadcasting the commercial. Record 56 includes a description of Commercial T, a start-time type of Manual, a duration of 00:00:30:00, and a media source identifier of ID-Server-A. Based on this record, sequencing system 208 can cause MBS 200 to broadcast Commercial T, by causing various components of MBS 200 to perform various acts. For example, sequencing system 208 can cause a particular media source 202, namely a media server identified by the identifier ID-Server-A, to, before a to be determined (TBD) start time, load Commercial T (as identified by the identifier ID-Com-T). Further, sequencing system 208 can cause the media server to, at the TBD start time, playout Commercial T. Further, sequencing system 208 can cause one or more components of networking system 204 to, at the TBD start time, change their input-to-output mappings such that the media server can start transmitting Commercial T, via networking system 204, to distribution system 210.

As noted above, a manual start-time type indicates that the start time is when a trigger event occurs. As such, with respect to the event of Record 56, until sequencing system 208 can determine that the trigger event occurred, sequencing system 208 can be unable to determine a start time of the event of Record 56 (or the start times of the events of Records 57-60, which depend on the start time of the event of Record 56).

During the event of Record 55, sequencing system 208 can detect that the trigger event occurred. In one example, sequencing system 208 can detect this by making a determination that a particular signal is embedded in Program C, Segment 1. The particular signal can be a commercial roll signal, which in one example, can be an audio tone such as the Audio Cue Tone standard set forth in ANSI/SCTE 35 2013. In one example, sequencing system 208 can make this determination by periodically generating audio fingerprints of portions of Program C, Segment 1 and comparing each to a reference fingerprint of the tone until a match is found. However, other techniques for making this determination are possible as well.

In response to determining that the trigger event occurred, sequencing system 208 can determine the start time of the event of Record 56 as being the time at which the trigger event occurred. This can also allow sequencing system 208 to determine a duration of the event of Record 55 and the start times of the event of Records 56-60.

Figure 4B:
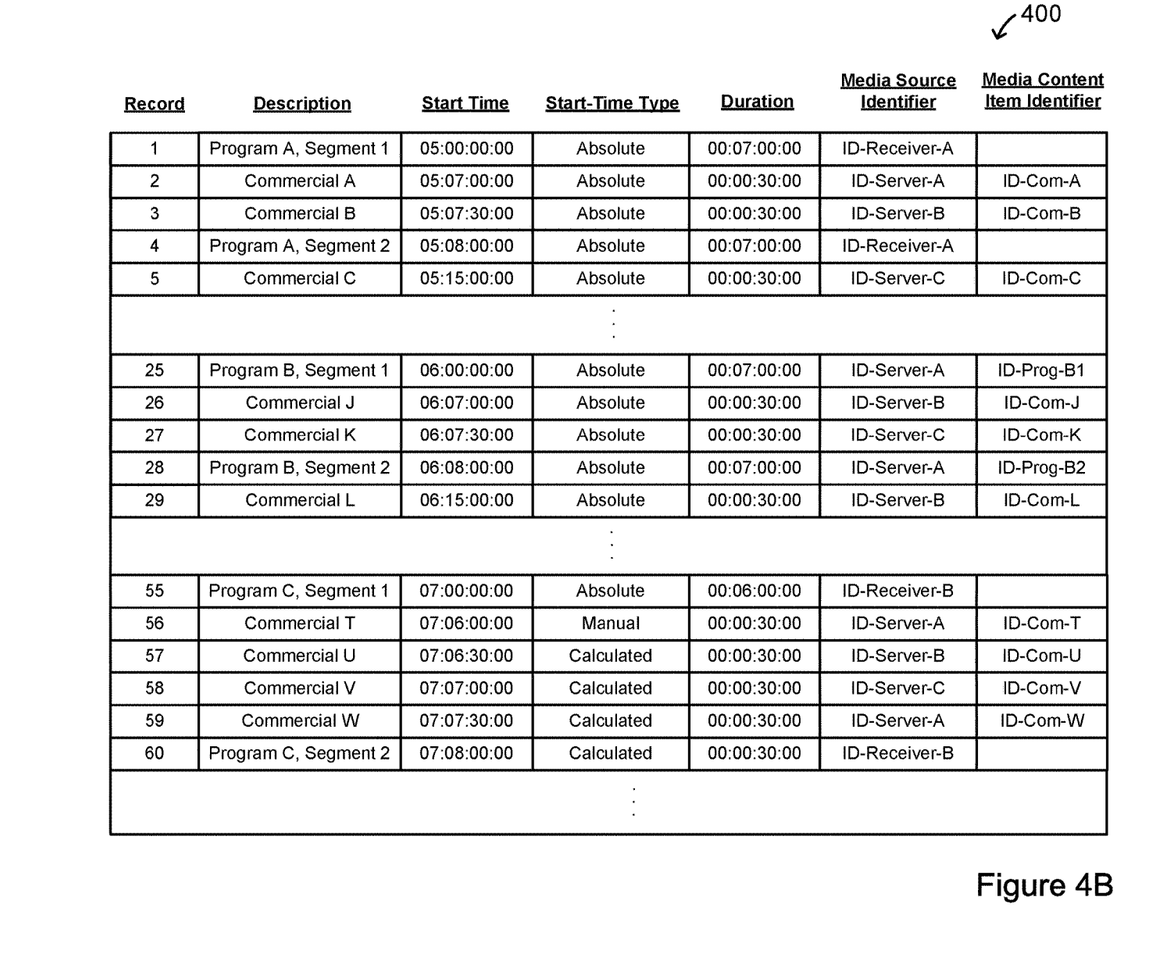
FIG. 4B is a simplified block diagram of the example broadcast schedule of FIG. 4A, but in a second state.

To illustrate this, assume that sequencing system 208 detects a trigger event at time 07:06:00:00. In response to detecting the trigger event, sequencing system 208 can modify the broadcast schedule 400 in various ways as shown in FIG. 4B. In particular, Record 56 now includes the start time of 07:06:00:00. Further, Record 55 now includes the duration of 00:06:00:00 and Records 57-60 now include the start times of 07:06:30:00, 07:07:00:00, 07:07:30:00, and 07:08:00:00, respectively.

Based on the modified data of Record 56, sequencing system 208 can cause the media server identified by the identifier ID-Server-A to, at time 07:06:00:00, playout Commercial T. Further, sequencing system 208 can cause one or more components of networking system 204 to, at time 07:06:00:00, change their input-to-output mappings such that the media server can start transmitting Commercial T, via networking system 204, to distribution system 210.

As noted above, when operating in the schedule mode, sequencing system 208 performs an act that facilitates broadcasting a media content item scheduled in a broadcast schedule. As an alternative to operating in the schedule mode, sequencing system 208 can operate in a breakout mode. When operating in the breakout mode, sequencing system 208 performs an act that facilitates broadcasting a media content item that is not scheduled in the broadcast schedule.

Sequencing system 208 can switch from operating in a schedule mode to operating in a breakout mode for various reasons. For example, in the case where a breaking news event occurs, it can be desired to interrupt a broadcast of regularly-scheduled programming and replace it with a broadcast of unscheduled programming related to the breaking news event. In one example, sequencing system 208 can cause this to happen by causing one or more components of networking system 204 to change their input-to-output mappings such that a breakout media source (e.g., a NPS that is producing breaking news content) can start transmitting a breakout media content item, via networking system 204, to distribution system 210.

In one example, sequencing system 208 can switch from operating in a schedule mode to operating in a breakout mode in response to detecting that a trigger event occurred (e.g., in response to receiving particular input from a user via a user interface). Later (e.g., after the breaking news event has ended or been adequately covered), sequencing system 208 can switch from operating in the breakout mode back to operating in the schedule mode. Again, sequencing system 208 can do this in response to detecting that a trigger event occurred (e.g., in response to receiving particular input from a user via a user interface).

In one example, while sequencing system 208 operates in the breakout mode, sequencing system 208 can simulate operating in the schedule mode. This simulated operation can include sequencing system 208 performing all acts that it would perform if it were operating in the schedule mode, except at least for an act that relates to control of networking system 204. Unlike when operating in the schedule mode, when operating in the breakout mode, sequencing system 208 causes one or more components of networking system 204 to change their input-to-output mappings such that the breakout media source can transmit the breakout media content item, via the networking system 204, to distribution system 210.

This simulated operation can provide various benefits. For example, by simulating operation of the schedule mode, sequencing system 208 can ensure that, when switching from operating in the breakout mode back to operating in the schedule mode, sequencing system 208 can resume operating in the schedule mode as if the initial switch to the breakout mode never occurred. Thus in some examples, following the breakout mode, the sequencing system can resume following the broadcast schedule beginning at a time point that is offset from a time point at which the breakout mode was initiated, and the extent of the time offset can be equal to the duration of the breakout mode operation. As another example, by simulating operation of the schedule mode, sequencing system 208 can generate a simulation log of media content items that were not broadcast as a result of sequencing system 208 operating in a breakout mode. Sequencing system 208 can then present this simulation log (or a modified version thereof) to a user via a user interface, which the user can consider and use as a basis to modify the broadcast schedule. In one example, this can include sequencing system 208 displaying the generated simulation log. Further, in one example, the user can select an item in the log (e.g., based on input received from a user via a user interface) and sequencing system 208 can responsively add the selected item and/or related data to the broadcast schedule.

To help ensure that sequencing system 208 generates an accurate simulation log, sequencing system 208 can perform various acts while operating in the breakout mode. For example, in the case where sequencing system 208 is simulating the broadcast of a first media content item (e.g., a program segment), sequencing system 208 can make a determination that a particular signal is embedded in the first media content item. In response to making this determination, sequencing system 208 can responsively simulate a switch from broadcasting the first media content item to broadcasting the second media content item (e.g., a commercial). This can help ensure that the simulation appropriately represents how sequencing system 208 would have operated in the schedule mode had the first media content item had the embedded signal. Based on the simulated broadcast of the first and second media content items, sequencing system 208 can then generate and present a simulation log, which can include the first and second media content items.

To illustrate this concept, consider again the broadcast schedule 400 shown in FIG. 4B and assume that a trigger event occurs at time 07:04:00:00, which causes sequencing system 208 to switch from operating in a schedule mode to operating in a breakout mode. In response, sequencing system 208 can cause one or more components of networking system 204 to, at time 07:04:00:00, change their input-to-output mappings such that a particular breakout media source 202 (e.g., an NPS), can start transmitting a breakout media content item, via networking system 204, to distribution system 210. Further, in response to sequencing system 208 switching from operating in the schedule mode to operating in the breakout mode, sequencing system 208 can also start to simulate operating in the schedule mode. Thus, sequencing system 208 can start simulating a broadcast of a remaining portion (i.e., the last two minutes) of Program C, Segment 1.

Further, sequencing system 208 can make a determination that a particular signal is embedded in Program C, Segment 1, and can responsively simulate a switch from broadcasting Program C, Segment 1 to broadcasting the Commercial T. Based on the simulated broadcast of Program C, Segment 1 and Commercial T, sequencing system 208 can generate a simulation log, which can indicate Program C, Segment 1, Commercial T, and perhaps other media content items (as the simulation dictates). Sequencing system 208 and can then present the generated simulation log as discussed above.

Figure 5:
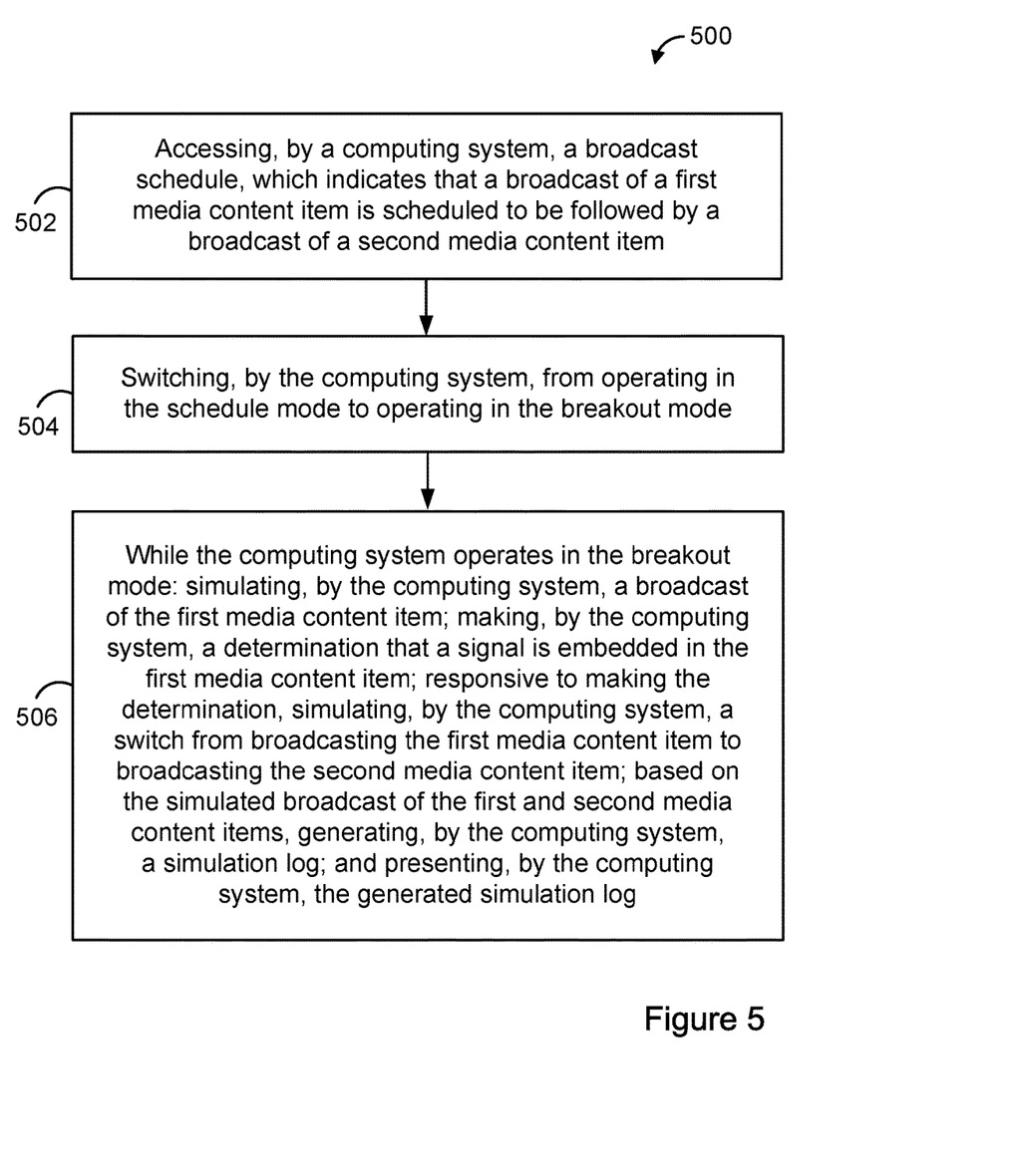
FIG. 5 is a flow chart of an example method.

FIG. 5 is a flow chart illustrating an example method 500. At block 502, method 500 can include accessing, by a computing system, a broadcast schedule, which indicates that a broadcast of a first media content item is scheduled to be followed by a broadcast of a second media content item. The computing system is configured for operating in a schedule mode or a breakout mode. When operating in the schedule mode, the computing system performs an act that facilitates broadcasting a media content item scheduled in the broadcast schedule. When operating in the breakout mode, the computing system performs an act that facilitates broadcasting a media content item that is not scheduled in the broadcast schedule.

At block 504, method 500 can include switching, by the computing system, from operating in the schedule mode to operating in the breakout mode.

At block 506, method 500 can include while the computing system operates in the breakout mode: simulating, by the computing system, a broadcast of the first media content item; making, by the computing system, a determination that a signal is embedded in the first media content item; responsive to making the determination, simulating, by the computing system, a switch from broadcasting the first media content item to broadcasting the second media content item; based on the simulated broadcast of the first and second media content items, generating, by the computing system, a simulation log; and presenting, by the computing system, the generated simulation log.

IV. Example Variations

Although some of the acts and/or functions described in this disclosure have been described as being performed by a particular entity, such acts and/or functions can be performed by any entity, such as those entities described in this disclosure. Further, although the described acts and/or functions have been recited in a particular order, the acts and/or functions need not be performed in the order recited. However, in some instances, it can be desired to perform the acts and/or functions in the order recited. Also, not all of the described acts and/or functions need to be performed to achieve one or more of the benefits provided by this disclosure, and therefore not all acts and/or functions are required.

Although certain variations have been discussed in connection with one or more examples of this disclosure, such variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
    accessing, by a computing system, a broadcast schedule, which indicates that a broadcast of a first media content item is scheduled to be followed by a broadcast of a second media content item, wherein the computing system is configured for operating in a schedule mode or a breakout mode, wherein when operating in the schedule mode, the computing system performs an act that facilitates broadcasting a media content item scheduled in the broadcast schedule, and wherein when operating in the breakout mode, the computing system performs an act that facilitates broadcasting a media content item that is not scheduled in the broadcast schedule;
    operating, by the computing system, in a breakout mode; and
    while the computing system operates in the breakout mode:
        simulating, by the computing system, a broadcast of the first media content item;
        making, by the computing system, a determination that a particular signal is embedded in the first media content item; and
        responsive to making the determination, simulating, by the computing system, a switch from broadcasting the first media content item to broadcasting the second media content item.

2. The method of claim 1, wherein the computing system is a sequencing system component of a media-broadcasting system.

3. The method of claim 1, wherein the second media content item is a commercial, and wherein the particular signal is a commercial roll signal.

4. The method of claim 3, wherein the commercial roll signal is an audio tone.

5. The method of claim 3, wherein the broadcast schedule indicates that the commercial is associated with a manual start-time type.

6. The method of claim 1, further comprising:
based on the simulated broadcast of the first and second media content items, generating, by the computing system, a simulation log, wherein the generated simulation log identifies the first and second media content items.

7. The method of claim 6, further comprising:
presenting, by the computing system, the generated simulation log, wherein presenting the generated simulation log comprises displaying the generated simulation log.

8. The method of claim 7, further comprising:
selecting, by the computing system, an item in the presented simulation log; and
while the computing system operates in the breakout mode:
performing, by the computing system, an act that facilitates broadcasting a media content item associated with the selected item.

9. A non-transitory computer-readable medium having stored thereon program instructions that upon execution by a processor, cause performance of a set of acts comprising:
accessing, by a computing system, a broadcast schedule, which indicates that a broadcast of a first media content item is scheduled to be followed by a broadcast of a second media content item, wherein the computing system is configured for operating in a schedule mode or a breakout mode, wherein when operating in the schedule mode, the computing system performs an act that facilitates broadcasting a media content item scheduled in the broadcast schedule, and wherein when operating in the breakout mode, the computing system performs an act that facilitates broadcasting a media content item that is not scheduled in the broadcast schedule;
operating, by the computing system, in a breakout mode; and
while the computing system operates in the breakout mode:
simulating, by the computing system, a broadcast of the first media content item;
making, by the computing system, a determination that a particular signal is embedded in the first media content item; and
responsive to making the determination, simulating, by the computing system, a switch from broadcasting the first media content item to broadcasting the second media content item.

10. The non-transitory computer-readable medium of claim 9, wherein the computing system is a sequencing system component of a media-broadcasting system.

11. The non-transitory computer-readable medium of claim 9, wherein the second media content item is a commercial, and wherein the particular signal is a commercial roll signal.

12. The non-transitory computer-readable medium of claim 11, wherein the commercial roll signal is an audio tone.

13. The non-transitory computer-readable medium of claim 11, wherein the broadcast schedule indicates that the commercial is associated with a manual start-time type.

14. The non-transitory computer-readable medium of claim 9, the set of acts further comprising:
based on the simulated broadcast of the first and second media content items, generating, by the computing system, a simulation log, wherein the generated simulation log identifies the first and second media content items.

15. The non-transitory computer-readable medium of claim 14, the set of acts further comprising:
presenting, by the computing system, the generated simulation log, wherein presenting the generated simulation log comprises displaying the generated simulation log.

16. The non-transitory computer-readable medium of claim 15, the set of acts further comprising:
selecting, by the computing system, an item in the presented simulation log; and
while the computing system operates in the breakout mode:
performing, by the computing system, an act that facilitates broadcasting a media content item associated with the selected item.

17. A computing system comprising:
a processor, and
a non-transitory computer-readable medium having stored thereon program instructions that upon execution by the processor, cause performance of a set of acts comprising:
accessing, by the computing system, a broadcast schedule, which indicates that a broadcast of a first media content item is scheduled to be followed by a broadcast of a second media content item, wherein the computing system is configured for operating in a schedule mode or a breakout mode, wherein when operating in the schedule mode, the computing system performs an act that facilitates broadcasting a media content item scheduled in the broadcast schedule, and wherein when operating in the breakout mode, the computing system performs an act that facilitates broadcasting a media content item that is not scheduled in the broadcast schedule;
operating, by the computing system, in a breakout mode; and
while the computing system operates in the breakout mode:
simulating, by the computing system, a broadcast of the first media content item;
making, by the computing system, a determination that a particular signal is embedded in the first media content item; and
responsive to making the determination, simulating, by the computing system, a switch from broadcasting the first media content item to broadcasting the second media content item.

18. The computing system of claim 17, wherein the second media content item is a commercial, and wherein the particular signal is a commercial roll signal.

19. The computing system of claim 18, wherein the commercial roll signal is an audio tone.

20. The computing system of claim 18, wherein the broadcast schedule indicates that the commercial is associated with a manual start-time type.

* * * * *